US010395301B2

(12) United States Patent
Magnusson et al.

(10) Patent No.: US 10,395,301 B2
(45) Date of Patent: Aug. 27, 2019

(54) METHOD, MEDIUM, AND SYSTEM FOR USING A COMBINATION OF BATCH-PROCESSING AND ON-DEMAND PROCESSING TO PROVIDE RECOMMENDATIONS

(71) Applicant: Stitch Fix, Inc., San Francisco, CA (US)

(72) Inventors: Jeffrey S. Magnusson, Half Moon Bay, CA (US); LiKuan Alex Chen, Burlingame, CA (US); Akshay Wadia, San Francisco, CA (US)

(73) Assignee: Stitch Fix, Inc., San Francisco, CA (US)

( * ) Notice: Subject to any disclaimer, the term of this patent is extended or adjusted under 35 U.S.C. 154(b) by 559 days.

(21) Appl. No.: 15/142,541

(22) Filed: Apr. 29, 2016

(65) Prior Publication Data

US 2017/0316485 A1   Nov. 2, 2017

(51) Int. Cl.
*G06Q 30/00* (2012.01)
*G06Q 30/06* (2012.01)

(52) U.S. Cl.
CPC .................. *G06Q 30/0631* (2013.01)

(58) Field of Classification Search
CPC ............ G06Q 30/0631; G06F 9/45558; G06F 9/4843; G06F 9/4881; G06F 9/466
See application file for complete search history.

(56) References Cited

U.S. PATENT DOCUMENTS

| 5,115,392 A * | 5/1992 | Takamoto ............... G06F 9/466 718/101 |
| 8,707,259 B2 | 4/2014 | Trofin et al. |
| 2015/0095841 A1 | 4/2015 | Fiedler et al. |

OTHER PUBLICATIONS

Meira, D. "A Comparative Study of Scalable Implementations of the Alternating Least Squares Algorithm for Collaborative Filtering Recommendation." (Year: 2015).*

* cited by examiner

Primary Examiner — Matthew E Zimmerman
(74) Attorney, Agent, or Firm — Van Pelt, Yi & James LLP (57) ABSTRACT

Systems and methods described herein, which utilize a combination of batch-processing and on-demand processing to provide recommendations, can include database(s) that store client data, item data, and executable code for composable algorithms that utilize the client data and/or the item data to provide recommendations. The system also includes a batch-process resultsP data store that stores results of composable algorithms executed using batch-processing. Additionally, the system includes an algorithm engine that accepts calls to composable algorithms and output results thereof. The algorithm engine determines which called composable algorithms are designated as being executable using batch-processing, and which are designated as being executable using on-demand processing. The algorithm engine returns results of called composable algorithms designated as being executable using on-demand processing by executing the executable code thereof, and returns results of called composable algorithms designated as being executable using batch-demand-processing by obtaining the results from the batch-process results data store.

32 Claims, 4 Drawing Sheets

METHOD, MEDIUM, AND SYSTEM FOR USING A COMBINATION OF BATCH-PROCESSING AND ON-DEMAND PROCESSING TO PROVIDE RECOMMENDATIONS

FIELD OF TECHNOLOGY

Embodiments of the present technology generally relate to systems and methods for providing recommendations, and more specifically, to systems and methods that execute algorithms that can be used to provide recommendations.

BACKGROUND

Recommendations systems are becoming increasingly common in online sales and digital media sites. Such systems often use recommendation algorithms and information about a user's preferences and purchasing behavior to recommend content and/or goods (which can collectively be referred to as items) for which the user may be interested. Such recommendation algorithms may, for example, be developed by data scientists, and then handed over the software engineers for final coding before such algorithms are ready for providing actual recommendations to actual clients. A potential problem with this scheme is that the software engineers may not fully understand the logic behind the algorithms, and thus, may inadvertently change their functions. Another potential problem with recommendation systems is that they may provide stale recommendations, meaning they may recommend items that are no longer available (e.g., the items may no longer be in inventory), and/or they may not consider new inventory (e.g., if a recommendation algorithm was run before an item or inventory database was updated). Additionally, recommendation systems, depending upon their design, may take an inordinate amount of time to provide recommendations, which may frustrate clients, potentially causing companies to lose potential sales.

SUMMARY

Certain embodiments of the present technology are directed to recommendation systems that utilize a combination of batch-processing and on-demand processing in order to efficiently and effectively provide recommendations. Such a system can include one or more databases that store client data for a plurality of clients, item data for a plurality of items that are available for recommending to the clients, and executable code for each of a plurality of composable algorithms that utilize the client data and/or the item data to provide recommendations. The system can also include a batch-process results data store that stores results of one or more of the composable algorithms that are executed using batch-processing. Additionally, the system can include an algorithm engine that has a corresponding algorithm engine interface. The algorithm engine interface can accepts calls to one or more of the composable algorithms and output results of the called composable algorithms, wherein the calls that are accepted by the algorithm engine interface do not distinguish between whether the composable algorithms being called are designated as being executable using batch-processing or designated as being executable using on-demand processing. The algorithm engine can determine which of the called composable algorithms are designated as being executable using batch-processing, and which of the called composable algorithms are designated as being executable using on-demand processing. The algorithm engine can returns results of called composable algorithms designated as being executable using on-demand processing by executing the executable code of the called composable algorithms designated as being executable using on-demand processing. Further, the algorithm engine can return results of called composable algorithms designated as being executable using batch-demand-processing by obtaining the results, of the called composable algorithms designated as being executable using batch-processing, from the batch-process results data store.

In accordance with certain embodiments, the algorithm engine provides the results that the algorithm engine returns to the algorithm engine interface so that the algorithm engine interface can output the results.

In accordance with certain embodiments, during one or more instances that the algorithm engine executes the executable code for one or more of the called composable algorithms designated as being executable using on-demand processing, the algorithm engine combines the results of the one or more composable algorithms designated as being executable using on-demand processing with the results of one or more of the called composable algorithms designated as being executable using batch-processing that are obtained from the batch-process results data store.

In accordance with certain embodiments, during one or more instances that the algorithm engine executes the executable code for one or more of the called composable algorithms designated as being executable using on-demand processing, the algorithm engine utilizes one or more results obtaining from the batch-process results data store as one or more inputs to at least one of the one or more of the called composable algorithms designated as being executable using on-demand processing.

In accordance with certain embodiments, the executable code, of each of the one or more of the composable algorithms that is/are designated as being executable using batch-processing, is executed by a service other than the algorithm engine and is executed in accordance with a predetermined schedule. By contrast, the executable code, of each the one or more of the composable algorithms that is/are designated as being executable using on-demand processing, is executed by the algorithm engine in response to being called.

In accordance with certain embodiments, at least one of the composable algorithms, for which executable code is stored in the algorithm database, invokes a combination of two or more of the other composable algorithms and includes logic for combining or otherwise using the results of the two or more other composable algorithms that are invoked.

In accordance with certain embodiments, each of the composable algorithms includes corresponding metadata and a corresponding computation function. The metadata for each of the composable algorithms can include at least a name of the composable algorithm, an author of the composable algorithm and a pointer. The metadata for each of the composable algorithms can also include an indication of whether the composable algorithm is executable using on-demand processing or using batch-processing. In accordance with certain embodiments, the pointer included in the metadata of a composable algorithm that is designated as being executable using on-demand processing points to a corresponding computation function; and the pointer included in the metadata of a composable algorithm that is designated as being executable using batch-processing points to a corresponding result of the composable algorithm stored as data in the batch-process results data store.

In accordance with certain embodiments, the system also includes cache memory in which the algorithm engine stores the results of one or more of the composable algorithms that are executed using on-demand processing so that the results are available, for a period of time specified by a cache interval, if at least one of the one or more of the composable algorithms for which the results are stored in the cache memory is called again during the cache interval.

In accordance with certain embodiments, the system also includes a graphical user interface (GUI) that displays information about one or more items that are recommended for a client, as determined using the algorithm engine, directly to a client or to an intermediary that is tasked with selecting items for the client. Additionally, or alternatively, the system can include a GUI that enables an author of a new composable algorithm to test the new composable algorithm and visualize the results of the new composable algorithm.

In accordance with certain embodiments, one or more of the composable algorithms that are executed using on-demand processing utilize the results of one or more of the composable algorithms that are executed using batch-processing and stored in the results data store. In such embodiments, the results of one or more of the composable algorithms that are executed using on-demand processing can be used, e.g., to recommend one or more items to one or more clients.

In accordance with certain embodiment, the client data stored for each of a plurality of clients includes a unique client identifier (client ID) and one or more attributes associated with the client. Similarly, the item data stored for each of a plurality of items can include a unique item identifier (item ID) and one or more attributes associated with the item.

In accordance with certain embodiments, the results of each of the composable algorithms, that are executed using batch-processing and stored in the results batch-process data store, comprises an array of tuples. In such embodiments, each of the tuples, in an array of tuples, can includes, e.g., a client ID or an item ID and a corresponding score.

In accordance with certain embodiments, two or more of the composable algorithms comprise similarity algorithms, each of which is used to compare the attributes of different ones of the items to one another, the attributes of different ones of the clients to one another, or the attributes of one or more of the clients to the attributes of one or more of the items.

Certain embodiments of the present technology are also directed to methods that utilize a combination of batch-processing and on-demand processing in order to efficiently and effectively provide recommendations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Certain embodiments of the present technology relate to recommendation systems and methods for use therewith that utilizes a combination of batch-processing and on-demand processing in order to efficiently and effectively provide recommendations. The benefits, features, and advantages of the various embodiments of the present technology will become better understood with regard to the following description, and accompanying drawings. The following description is presented to enable one of ordinary skill in the art to make and use embodiments of the present technology as provided within the context of a particular application and its objective. Various modifications to the embodiments described herein will, however, be apparent to one skilled in the art, and the general principles defined herein may be applied to other embodiments. Therefore, the embodiments of the present invention are not intended to be limited to the particular embodiments shown and described herein, but are to be accorded the widest scope consistent with the principles and novel features herein disclosed.

In the description that follows, like numerals or reference designators will be used to refer to like parts or elements throughout. In addition, the first digit of a three digit reference number typically identifies the drawing in which the reference number first appears.

Figure 1:
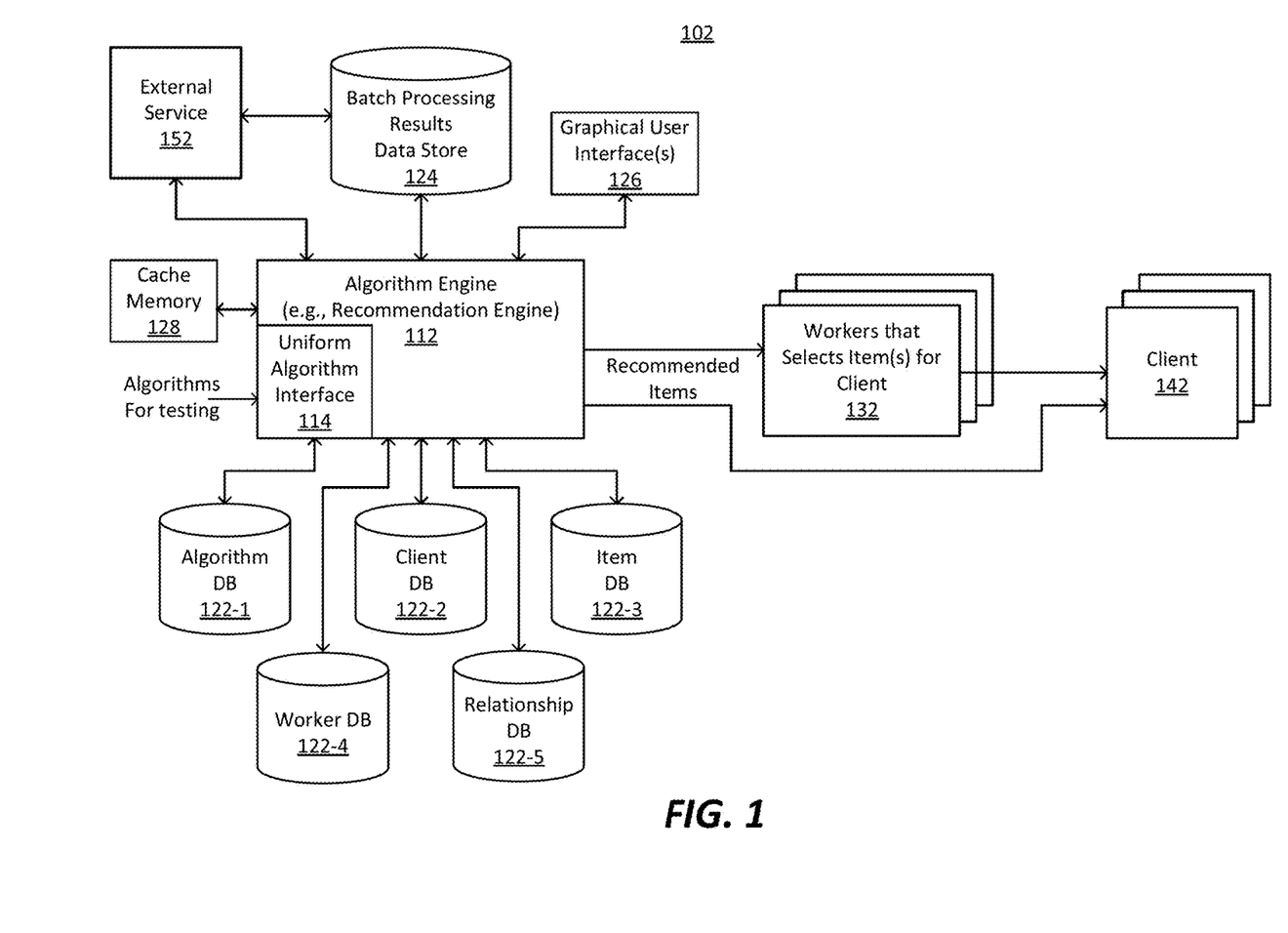
FIG. 1 illustrates a recommendation system according to an embodiment of the present technology that utilizes a combination of batch-processing and on-demand processing in order to efficiently and effectively provide recommendations.

FIG. 1 illustrates a recommendation system 102, according to an embodiment of the present technology, which utilizes a combination of batch-processing and on-demand processing in order to efficiently and effectively provide recommendations. The system 102 can execute algorithms to provide recommendations directly to clients. Additionally, or alternatively, the system 102 can execute algorithms to provide recommendations to workers (also referred to as entities) that select items for clients. The system 102 may also execute algorithms that are not immediately used to provide recommendations, but the results of which may at a later point in time be used to provide recommendations to clients or entities that select items for clients. As will be described in additional detail below, the system 102 can also be used to test new algorithms, before such algorithms are used for providing actual recommendations to actual clients or entities that select items for clients. The system 102 can also be used to execute other types of algorithms, which are not necessarily used to provide recommendations. The system 102 may also have additional capabilities, as will be understood from the description below.

Referring to FIG. 1, the system 102 is shown as including an algorithm engine 112 that is communicatively coupled to an algorithm database 122-1, a client database 122-2, an item database 122-3 (which can also be referred to as an inventory database 122-3), a worker database 122-4 and a relationship database 122-5. The databases 122-1, 122-2 and 122-3, 122-4 and 122-5 can be individually referenced as a database 122, or collectively referenced as databases 122. Also shown in FIG. 1 are blocks 132, which represent workers (also referred to as entities) that can select one or more items for clients, and blocks 142, which represent the clients for which the item(s) is/are recommend and potentially selected. The workers 142 can, for example, be people that have an expertise related to items included in an item inventory for which information is stored in the item database 122-3.

In accordance with an embodiment, the algorithm database 122-1 stores a plurality of different algorithms, at least some of which can be recommendation algorithms. More specifically, the algorithm database 122-1 can store executable code for algorithms, which code can be executed by the algorithm engine 112, or potentially by another service (e.g., 152 in FIG. 1) external to the algorithm engine 112. Where the algorithm engine 112 is used to execute the executable code of recommendation algorithms stored in the algorithm database 122-1, the algorithm engine 112 can be more specifically referred to as a recommendation engine 112. A composable recommendation algorithm stored in the algorithm database 122-1 can, for example, utilize client information and/or item information in a different manner than the other algorithms to identify, for any particular one of the clients, a subset of the items in the item inventory that is recommended for the particular one of the clients. Such composable recommendation algorithms can also be referred to as recommendation rules, and the algorithm database 122-1 can similarly also be referred to as a recommendation rule database. For another example, a composable recommendation algorithm stored in the algorithm database 122-1 can be used to match workers 132 with clients 142.

In accordance with embodiments of the present technology, the algorithms stored in the algorithm database 122-1 (and more specifically, the algorithms whose executable code is stored in the algorithm database 122-1) are composable algorithms, which can be selected and assembled (i.e., combined) in various different combinations to satisfy various different objectives. The composability of the algorithms stored in the algorithm database 122-1 promotes reuse of the algorithms. A composable algorithm, as the term is used herein, is an algorithm that is both modular and stateless. Modular means that an algorithm may cooperate with other algorithms (by using the output of another algorithm as its input and/or providing its output as an input to another algorithm) and that the algorithm may be swapped out and replaced with another algorithm. Stateless means that an algorithm treats each call or invocation as an independent transaction, unrelated to previous calls or invocations. With composable algorithms, the result (i.e., output) of an algorithm can be is passed as an argument of (i.e., an input to) a next algorithm, and the result of the last algorithm can be the result (i.e., output) of the whole.

In accordance with certain embodiments of the present technology, each of the composable algorithms that is stored in the algorithm database 122-1 is designated as (e.g., tagged as) either being executable using on-demand processing, or being executable using batch-processing. In accordance with certain embodiments of the present technology, each of the composable algorithms includes corresponding metadata and a corresponding computation function. The metadata for each of the composable algorithms that is designated as being executable using on-demand processing can include at least a name of the composable algorithm, an author of the composable algorithm and a pointer to the corresponding computation function. The metadata for each of the composable algorithms that is designated as being executable using batch-processing can include at least a name of the composable algorithm, an author of the composable algorithm and a pointer to a result of the composable algorithm (which result is stored as data in the batch-processing results data store 124). Each computation function can be a class, and all computation functions of composable algorithms that are designated as being executable using on-demand processing may inherit from a top level base class. In certain embodiments, each of the composable algorithms can be thought of as a directed graph or tree, which may include a root as well as some leaves.

In accordance with preferred embodiments of the present technology, the format of the output of each of the composable algorithms is independent of whether the composable algorithm is, was, or will be processed using on-demand or batch-processing. In other words, the outputs of all of the composable algorithms, whether they are designated as being executable using on-demand processing or batch-processing, should have the same format. Beneficially, with such embodiments, when a composable algorithm is being developed, e.g., by a data scientist, the data scientist (which can also be referred to as an algorithm developer) need not think about whether one or more other composable algorithm(s) that the composable algorithm being developed may invoke and/or be combined or composed with is/are designated for on-demand processing or batch-processing, because the structure of the output of each of the composable algorithms is independent of whether it is, was, or will be processed using on-demand or batch-processing.

In accordance with certain embodiments, all of the composable algorithms that are designated as being executable using on-demand processing are written in a same programming language. For example, the programming language in which all of the composable algorithms that are designated as being executable using on-demand processing can be Python, C++, Java, Perl, R, or Ruby, but is not limited thereto. When all composable algorithms that are designated as being executable using on-demand processing are written in the same programming language (e.g. Python), the algorithm engine 112 can be optimized to employ features of the programming language (e.g. deduplication of function calls internal to algorithms, composition by pipelining function calls using generators) to optimize composition and execution. In certain embodiments, introspection and/or abstract syntax tree parsing can be used to further optimize function composition.

By contrast, the composable algorithms that are designated as being executable using batch-processing need not be written in the same programming language as the composable algorithms that are designated as being executable using on-demand processing, or as one another. Nevertheless, there may be certain benefits to a composable algorithm that may be designated as being executable using batch-processing being written in the same programming language (e.g., Python) as the composable algorithms that are designated as being executable using on-demand processing. Such benefits include the option of changing the execution designation of the composable algorithm from being executable using batch-processing to being executable using on-demand processing. Accordingly, in such cases, when a composable algorithm is ready for deployment, e.g., after testing and debugging and/or the like, the data scientist or some other individual or team can determine and designate whether the algorithm will be executable using on-demand processing or batch-processing. It would also be possible that a further algorithm is used to analyze algorithms and provide recommendations as to whether it would be better to execute specific composable algorithms using on-demand processing or batch-processing. Further, it is noted that people may be employed to perform algorithms that are designated as being executable using batch-processing, e.g., where expert human judgements is to be employed.

As will be described in additional detail below, the results of various composable algorithms can be combined. For example, a first composable algorithm may invoke one, two or more other composable algorithms and include logic that combines the results of the other composable algorithms to produce the result (also referred to as "the output") of the first composable algorithm. In accordance with certain embodiments of the present technology, one or more of the composable algorithms stored in the algorithm database 122-1 can utilize client data (stored in the client database 122-2) and/or the item data (stored in the item database 122-3) to provide recommendations. In one specific example, a first composable algorithm can accept a style as its input, and return a list of similar styles as its output (i.e., as its result). A second composable algorithm can accept a client ID as its input, determine which styles the client (corresponding to the client ID) previously purchased and/or rated highly, and invoke the first composable algorithm for each of the styles the client previously purchased and/or rated highly, to thereby return multiple lists of styles as its output (i.e., as its results). A third composable algorithm can merge or otherwise combine the multiple lists into a single list, and filter the single list to output an array of outputs representing recommended styles for that client.

As noted above, in accordance with certain embodiments of the present technology, each of the composable algorithms that is stored in the algorithm database 122-1 is designated as (e.g., tagged as) either being executable using on-demand processing, or being executable using batch-processing. For example, where composable algorithms are registered with the algorithm engine 112, information that designates whether a specific composable algorithm is executable using on-demand processing or using batch-processing can be stored by the algorithm engine 112 when the composable algorithm is registered with the algorithm engine 112. In certain embodiments, each composable algorithm that is stored in the algorithm database 122-1 includes metadata that indicates whether the algorithm is designated as being executable using on-demand processing, or is designated as being executable using batch-processing. Such metadata can be exposed or otherwise accessed by the algorithm engine 112. An equivalent way of saying that a composable algorithm is designated as being executable using on-demand processing is to say that the composable algorithm is designated for on-demand execution. An equivalent way of saying that a composable algorithm is designated as being executable using batch-processing is to say that the composable algorithm is designated for batch execution.

Where composable algorithms are written in the programming language in which on-demand algorithms are to be programmed, the aforementioned designators (as to whether a composable algorithm is executable using on-demand processing or batch-processing) and pointers associated with composable algorithms may be changed if desired, e.g., by the author of an algorithm or an individual or team that oversees system optimization. Such a designator and pointer may be changed to improve efficiency potentially at the expense of reducing efficacy, or to improve efficacy potentially at the expense of reducing efficiency. For example, while it may be more efficient to perform a specific composable algorithm using batch-processing (e.g., once per day), than it would be to perform the specific composable algorithm using on-demand processing whenever the algorithm is called, the results of the composable algorithm executed using batch-processing (by the time the results are used) will be more stale, and thus, will likely have a lower efficacy than if the composable algorithm were performed on-demand. On the other hand, while executing the specific composable algorithm using on-demand processing whenever the algorithm is called may provide for better results (and thus, better efficacy), it may take so long (e.g., many hours) for the algorithm to be executed, that the client 142 or worker 132 whose action invoked the call to the algorithm runs out of time or loses interest in the results. Over time, results data and/or other data can be analyzed to determine which composable algorithms are more appropriately designated as being executable using batch-processing and which composable algorithms are more appropriately designated as being executable using on-demand processing. In other words, it may not necessarily be the logic of a composable algorithm that dictates how the algorithm is to be executed (either using on-demand processing or batch-processing), but rather, it may be the designator. As noted above, such designators can be stored by the algorithm engine 112, e.g., when composable algorithms are registers with the algorithm engine 112, and/or the designators can be included in metadata of each of the composable algorithms. Other variations are also possible and within the scope of the embodiments described herein.

One strategy may be to designate composable algorithms that are computationally intensive (and thus take a long time to execute) as being executable using batch-processing, and to designate composable algorithms that are not computationally intensive (and thus can be quickly executed) as being executable using on-demand processing. One specific strategy can be to designate composable algorithms that accept a unique client ID as an input as being executable using on-demand processing.

The executable code, of each the composable algorithms that is designated as being executable using on-demand processing, is executed in real or near-real time by the algorithm engine 112 in response to being called$_{[JRK1]}$. By contrast, the executable code, of each of the composable algorithms that is designated as being executable using batch-processing, is executed by a service other than the algorithm engine 112 and is executed in accordance with a corresponding predetermined schedule. The block 152 shown in FIG. 1 represents such an external service, which can be, e.g., implemented using Apache Hadoop or Apache Spark, which are open-source software frameworks for distributed storage and distributed processing of very large data sets on computer clusters that can be built from commodity hardware. The external service can alternatively be implemented using custom code written in a programming language such as, but not limited to, Python, Java or R. In a specific implementation, the external service is implemented using custom code written in the R programming language that runs in Docker software containers. Further, it is noted that people may be employed to perform certain algorithms that are designated as being executable using batch-processing, e.g., where expert human judgements is to be employed.

All of the composable algorithms that are designated as being executable using batch-processing can be executed in accordance with a same schedule. However, more likely and preferably, each of the composable algorithms that is designated as being executable using batch-processing can be executed in accordance with its own respective schedule. For example, a first schedule associated with a first composable algorithm may specify that a first composable algorithm is to be executed, using all of the attributes of the items in the item database 122-3 as inputs, once per week; and a second schedule associated with a second composable algorithm may specify that a second composable algorithm is to be executed, using a specific subset of the attributes of the items in the item database 122-3 as inputs, once per day. Alternatively, a schedule may specify that a composable algorithm is to be executed once every X hours, or once every Y days, or once every Z weeks, or in response to a specified triggering event. An exemplary triggering event can be that a specified length of time has elapsed since a specific composable algorithm was most recently executed. Another exemplary triggering event can be that the inventory changed by more than a certain percent since a specific composable algorithm was most recently executed. These are just a few exemplary triggering events that are not intended to be all inclusive. The schedule associated with a composable algorithm can be provided to and stored by the algorithm engine 112 whenever a composable algorithm is registered with the algorithm engine 112. Alternatively, the schedule associated with a composable algorithm can be included within the metadata for the composable algorithm. Other variations are also possible and within embodiments described herein.

In accordance with an embodiment, all composable algorithms are stored within the algorithm database, regardless of whether the composable algorithm is designated as being executable using on-demand processing or using batch-processing. Where a composable algorithm is designated as being executable using on-demand processing, the algorithm engine 112 will execute the executable code of the composable algorithm, as noted above. Where a composable algorithm is designated as being executable using batch-processing, the algorithm engine 112 can pass the executable code of the composable algorithm to the external service 152 and instruct the external service to execute the executable code. In one embodiment, the algorithm engine 112 maintains the schedules associated with composable algorithms that are designated as being executable using batch-processing, and the algorithm engine 112 instructs the external service 152 when to execute code of composable algorithms based on the schedules. In another embodiment, the algorithm engine 112 provides the schedules (associated with composable algorithms that are designated as being executable using batch-processing) to the external service 152, and the updates to the schedules when appropriate, and the external service 152 thereafter autonomously invokes executing code of composable algorithms in accordance with the schedules. In accordance with certain embodiments, the external service 152 autonomously invokes composable algorithms that are designated as being executable using batch-processing and updates the batch-processing results data store 124 with fresh data.

In accordance with embodiments of the present technology, results of the composable algorithms that are executed using batch-processing are stored in a batch-process results data store 124. The algorithm engine 112 is communicatively coupled to the batch-process results data store 124 so that the algorithm engine 112 can access batch-processing results that are stored therein. The algorithm engine 112 may access the batch-process results data store 124 in response to a call to an algorithm for which it has been designated should be executed using batch-processing. More specifically, in response to receiving a call to a composable algorithm, the algorithm engine 112 will determine whether the called composable algorithm has been designated as being executable using batch-processing or on-demand processing. Where the algorithm engine 112 determines that the called composable algorithm has been designated as being executable using batch-processing, the algorithm engine will not execute the composable algorithm in real or near-real time, but rather, will obtaining already determined results of the called composable algorithm from the batch-process results data store 124.

The batch-process results data store 124 can be, e.g., a relational database such as, but not limited to, a MySQL, PostgreSQL, Microsoft SQL Server, or Oracle Database. Alternatively, the batch-process results data store 124 can be an object-oriented databases, like Caché or ConceptBase, but not limited thereto. The batch-process results data store 124 can alternatively be a distributed data store, such as, but not limited to, Apache Cassandra, Hadoop distributed file system (HDFS), Druid or DynamoDB.

The uniform algorithm engine interface 114 accepts calls to one or more of the composable algorithms and outputs results of the called composable algorithms. The calls can be received, e.g., from computing devices associated with clients 142 that would like recommendations, or from computing devices associated with workers 132 that are tasked with selecting or recommending items for clients 142, but are not limited thereto. For example, the calls can also be invoked by other composable algorithms. In accordance with certain embodiments of the present technology, the calls that are accepted by the algorithm engine interface 114 do not distinguish between whether the composable algorithms being called are designated as being executable using batch-processing or executable using on-demand processing. In other words, calls to composable algorithms designated as being executable using batch-processing or formatted the same as, and are indistinguishable from, calls to composable algorithms designated as being executable using on-demand processing. Rather, the algorithm engine 112 determines or otherwise identifies which of the called composable algorithms is/are designated as being executable using batch-processing, and which of the called composable algorithms is/are designated as being executable using on-demand processing. The algorithm engine 112 may do this by referencing information that designates whether a specific composable algorithm is executable using on-demand processing or using batch-processing, which information is stored by algorithm engine 112 whenever a composable algorithm is registered with the algorithm engine 112. Alternatively, algorithm engine 112 may do this by referencing metadata, stored within the algorithm database 122-1, which metadata indicates whether a specific composable algorithm is designated as being executable using on-demand processing or using batch-processing. Other variations are also possible and within embodiments described herein.

The algorithm engine 112 can include, inter alia, one or more programmable processors that is/are used to execute executable code of composable algorithms stored in the algorithm database 122-1. Further, the algorithm engine 112 can include one or more computer programs that are executable by the programmable processor(s) and used to implement the capabilities of the algorithm engine 112. These computer programs (also known as programs, software, software applications, applications, components, or code) can include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs), but not limited thereto) used to provide machine instructions and/or data to a programmable processor, including a machine-readable medium that receives machine instructions as a machine-readable signal. The term "machine-readable signal" refers to any signal used to provide machine instructions and/or data to a programmable processor. The computer programs can include, inter alia, application program interfaces (APIs) that set forth routines, protocols and tools for building software and applications that can interface with the algorithm engine 112.

As shown in FIG. 1 and noted above, the algorithm engine 112 can also include a uniform algorithm interface 114 that enables that algorithm engine 112 to access composable algorithms stored in the algorithm database 122-1, in the same manner, regardless of whether the composable algorithms are to be executed using on-demand processing or batch-processing. The uniform algorithm interface 114 can also enable composable algorithms that are to be tested to be uploaded to the algorithm engine 112. For example, the author of a new composable algorithm (e.g., a data scientist) may want to test the new composable algorithm, in order to determine if it provides the results that are desired or expected. To further assist with such testing, the system 102 can include a graphical user interface (GUI) 126 that enables the author of the new composable algorithm (e.g., a data scientist) to visualize the results of the new composable algorithm.

Beneficially, embodiments described herein can combine the benefits (e.g., computing power and efficiency) of batch-processing with the benefits (e.g., timeliness) of on-demand processing that is performed in real-time or near-real-time. Batch-processing is well suited, e.g., for distributed processing against very large data sets. On-demand processing is well suited, e.g., for deferring processing to call time, and taking into account the most up to date data. By combining on-demand processing and batch-processing, embodiments described herein can achieve the merits of both types of processing. As an example, assume that a goal is to provide personalized recommendations of four items to each of the clients included in the client database 122-2, wherein there are millions of clients for which data is stored in the client database 122-2; and that there are tens of thousands of items for which data is stored in the item database 122-3. An exemplary end result or output can be the probability that a client will purchase an item. Each of the clients and each of the items can have tens, or hundreds, or even thousands of features or attributes. Some of the features or attributes may require data extraction and processing; while other features or attributes may require knowledge of multiple clients and multiple items. Certain calculations, which would be expensive to execute in real-time or near-real-time, and thus, would be better to be executed using batch-processing. For an example, calculations that are massively iterative would be better to be executed using batch-processing. Other calculations, which would be expensive to perform using batch-processing, in terms of computational resources, time, and storage of results, would be better to be executed using on-demand processing only when necessary. Using embodiments of the present technology, certain computations are computed using batch-processing, and their results are stored in the batch-processing results data store 124, and other computations access the batch-processing results data store 124 in order to generate final client recommendations on-demand, e.g., by computing one or more cross-products.

The system 102 can include one or more further GUIs. For example, the system 102 can include a GUI that displays information about one or more items that are recommended for a client, as determined using the algorithm engine 112, directly to a client 142 or to an intermediary (e.g., a worker 132) that is tasked with selecting items for the client 142. Different GUIs can be provided for workers 132 than for clients 142.

In accordance with certain embodiments of the present technology, the system 102 can utilize aggressive caching to increase efficiency. More specifically, the system 102 can include cache memory 128 within which the algorithm engine 112 stores the results of one or more of the composable algorithms that are executed using on-demand processing so that the results are available for a period of time specified by a cache interval. This way, if a composable algorithm for which the results are stored in the cache memory 128 is called again during the cache interval, the results stored in the cache memory 128 can be accessed and used, rather than again executing the executable code of the composable algorithm. The cache interval can be, e.g., M minutes, or N hours, but is not limited thereto. The cache interval can be the same for all algorithms that are designated as being executable using on-demand processing. Alternatively, each of the algorithms that is designated as being executable using on-demand processing can have its own corresponding cache interval, e.g., stored in metadata associated with the algorithm. Other variations are possible and within the scope of embodiments described herein.

Preferably, the system 102 is a distributed system that provides for scalability and parallelism, as well as aggressive caching, as was mentioned above. The system 102 is scalable, e.g., in that the external service(s) 152 can be scaled up or down based on the magnitude and frequency of composable algorithms that are designated as being executable using batch-processing. Further, where appropriate, multiple composable algorithms can be performed in parallel to reduce overall processing times.

In accordance with a preferred embodiment, the algorithm engine 112 allows authors of algorithms to compose algorithms arbitrarily, without having to worry about the logistics of the algorithms, and the algorithm engine 112 itself transparently orchestrates the execution of composed composable algorithms.

In accordance with certain embodiments of the present technology, the results of each of the composable algorithms, that are executed using batch-processing and stored in the results batch-process data store 124, comprises an array of tuples. Each of the tuples, in an array of tuples, can include a client ID and/or an item ID, a corresponding score, and corresponding metadata. A score can be, e.g., a similarity score, a dissimilarity score, a probability of success score, a profitability score, or the like, but is not limited thereto. The metadata included in a tuple can be an unstructured field (e.g., a JSON map) that is used to provide context or evidence supporting a result. An exemplary array of two 3-tuples is [(1, 2.4, {'related_purchases': [4,5]}), (11, 1.8, {'related_purchases': [6] })].

Exemplary types of data that can be stored in the various databases 122 are described below. Still referring to FIG. 1, the client database 122-2 can be adapted to store client data, which can also be referred to as client information, for each of a plurality of clients 142. The client data that is stored in the client database 122-2, for each of a plurality of clients 142, can include a unique client identifier (client ID) and one or more attributes associated with the client. The item database 122-3 is adapted to store item data, which can also be referred to as item information, for each of a plurality of items included in an item inventory. The item data that is stored in the item database 122-3, for each of a plurality of items, can include a unique item identifier (item ID) and one or more attributes associated with the item. In accordance with an embodiment, clients are people that have requested that items be selected for them and provided (e.g., mailed, shipped, sent, uploaded or otherwise provided) to them. Exemplary client attributes and item attributes that can be stored, respectively, in the client database 122-2 and the item database 122-3 are described below.

The items in the item inventory can be, for example, women's apparel, with each item in the item inventory corresponding to a different piece of women's apparel. For a more specific example, the items in the item inventory can include pants, skirts, dresses, shirts, sweaters, jackets, bracelets, necklaces, scarfs, hats and/or the like. The item information stored in the item database 122-3 can include, for each of the items in the item inventory, a plurality of item attributes. Some of the items attributes can be objective attributes, while other attributes can be subjective attributes. Exemplary objective item attributes include: an item stock keeping unit (SKU) number, an item type (e.g., pant, skirt, dress, etc.), an item designer and/or brand, an item size, an item color, an item pattern (e.g., solid, checked, pinstripe, etc.), an item material (e.g., cotton, wool, synthetic, etc.), and/or the like. It is also possible that an item SKU number be used as the unique client ID. Exemplary subjective item attributes include: good for tall women, good for short women, good for busty women, good for women in the State of Texas, good for preppy women, good for women in their 20s, good for women in their 50s, good for women with a long torso, casual, dressy, good for tropical vacations, good for spring, good for winter, fits true to size, runs small, runs large, and/or the like. Subjective items attributes may also specify for which one or more body types (e.g., straight, pear, spoon, hourglass, top hourglass, inverted triangle, oval, diamond, etc.) an item is appropriate. At least some of the objective items attributes can be automatically entered into the item database 122-3, while other objective item attributes can be manually entered into the item database 122-3. In accordance with an embodiment, the subjective item attributes are specified by entities (e.g., people) that have an expertise in the type of items included in the inventory and are manually entered into the item database 122-3. The item inventory can also specify how many units of each item are presently in the item inventory. Additionally, the item inventory can specify how many units of each item have been ordered, as well as when ordered items are expected to be received to replenish the item inventory. Item attributes can also specify how often an item has been provided to clients, how often the item has been accepted (e.g., purchased) by clients and/or how often the item, once provided to clients, has been accepted (e.g., purchased) by clients. These are just some examples of the types of items attributes that can be stored in the item database 122-3, which examples are not intended to be all encompassing. At least some of the item attributes, or more generally at least a portion of the stored item information, for each of the items in the item inventory, is initially at least partly based on inputs accepted from an entity that is tasked with specifying item attributes. For example, a web based user interface can be presented to an entity that enables them to enter objective and subjective information about items, e.g., in response to questions or the like.

As noted above, the client data stored in the client database 122-2 can include client attributes associated with each of a plurality of clients. Some of the client attributes can be objective attributes, while other attributes can be subjective attributes. Exemplary objective client attributes include: date of birth and/or age, height, weight, waist size, chest size, bra size, inseam length, torso length, shirt size, dress size, pant size, residential address, whether or not the client is a mother, occupation, and/or the like. Exemplary subjective client attributes include: preferred style (e.g., classic, preppy, casual, bohemian, etc.), preferred fit (e.g., loose, fitted, tight, etc.), preferred color scheme (e.g., bright, subdued), preferred patterns (e.g., solids, stripes, floral), and/or the like.

Subjective client attributes can also specify to what extent a client likes specific styles, such as, but not limited to, casual, edgy, bohemian, classic, glamorous, preppy, romantic, and/or the like. Subjective client attributes can be binary (e.g., no or yes, or 0 or 1), or can have greater levels of granularity (e.g., a number between 0 and 5, with 5 indicating the greatest preference). Subjective client attributes can also specify to what extent a client likes specific designers and/or brands. Subjective client attributes may also specify how much a client indicates they are willing to spend on specific types of items. Another exemplary client attribute is body type (e.g., straight, pear, spoon, hourglass, top hourglass, inverted triangle, oval, diamond, etc.). Additionally, the client information associated with a particular client can also specify how long the particular client has been a member of the recommendation service provided by the system 102, how often items have been shipped to the client, which items were purchased or otherwise accepted by the client, which items were returned or otherwise not accepted by the client, and/or the like, each of which are further examples of objective client attributes. Objective client attributes may also specify how much a client has actually spent on specific types of items. These are just some examples of the types of client attributes that can be stored in the client database 122-2, which examples are not intended to be all encompassing. In an embodiment, at least some of the client attributes, or more generally at least a portion of the stored client information, for each of the clients, is initially at least partly based on inputs accepted from the client. For example, a web based user interface can be presented to a client that enables the client to enter objective and subjective information about themselves, e.g., in response to questions or the like.

The worker database 122-4 can store information about workers 132 (which can also be referred to as entities), that may be employed or contracted to select items for clients 142. The worker data that is stored in the worker database 122-4, for each of a plurality of workers 132, can include a unique worker identifier (worker ID) and one or more attributes associated with the worker. Worker attributes, which are stored in the worker database 122-4, can include availability information about an availability of each of the plurality of workers 132 and capability information about one or more capabilities of each of the plurality of workers 132, but is not limited thereto. The availability information for each workers can include, for example, a work schedule, and an indication of whether or not the worker (while scheduled to perform work) is currently working on a task for a client, but is not limited thereto. In an embodiment, the capability information for each of the workers 132 can include worker resource attributes, such as, but not limited to, expertise, preference, age, equipment, geographic location, and/or the like.

The relationship database 122-5 is adapted to store relationship information about previously established relationships between specific combinations of the workers 132 and clients 142. In an embodiment, the relationship information indicates whether or not a particular worker 132 has previously performed a task for a particular one of the clients 132, and if so, whether (and/or, to what extent) the particular worker 132 successfully performed the task for the client 142. Such relationship information can alternative be stored in the worker database 122-4 and/or the client database 122-2, or in some other database.

Figure 2:
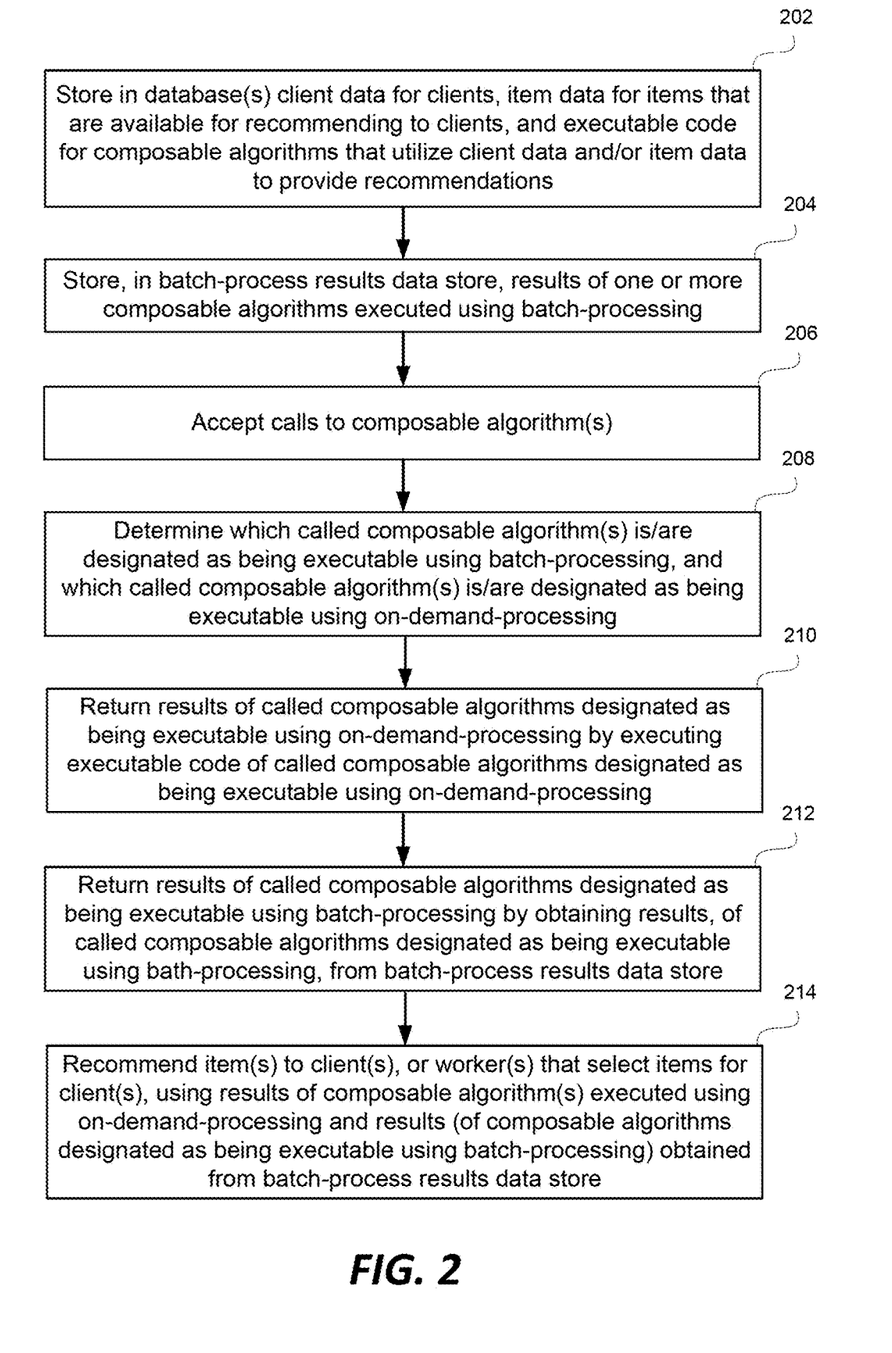
FIG. 2 is a high level flow diagram that is used to summarize methods, according to various embodiments of the present technology, which utilize a combination of batch-processing and on-demand processing in order to efficiently and effectively provide recommendations.

The high level flow diagram of FIG. 2 will now be used to summarize methods, according to various embodiments of the present technology, which utilize a combination of batch-processing and on-demand processing in order to efficiently and effectively provide recommendations.

Referring to FIG. 2, step 202 involves storing, in one or more databases, client data for a plurality of clients, item data for a plurality of items that are available for recommending to the clients, and executable code for each of a plurality of composable algorithms that utilize the client data and/or the item data to provide recommendations. Referring briefly back to FIG. 1, the executable code for each of a plurality of composable algorithms can be stored in the algorithm database 122-1; the client data for each of a plurality of clients can be stored in the client database 122-2; and the item data for each of a plurality of items can be stored in the item database 122-3.

Referring again to FIG. 2, step 204 involves storing, in a batch-process results data store, results of one or more of the composable algorithms that are executed using batch-processing (e.g., 124 in FIG. 1).

Still referring to FIG. 2, step 206 involves accepting calls to one or more of the composable algorithms. In accordance with certain embodiments described herein, the calls that are accepted do not distinguish between whether the composable algorithms being called are executable using batch-processing or executable using on-demand processing. Referring briefly back to FIG. 1, the uniform algorithm interface 114, and more generally the algorithm engine 112, can accept such calls.

Referring again to FIG. 2, step 208 involves determining which of the called composable algorithms is/are designated as being executable using batch-processing, and which of the called composable algorithms is/are designated as being executable using on-demand processing. Referring briefly back to FIG. 1, step 208 can be performed by the algorithm engine 112 using designators that are specified when composable algorithms are registered with the algorithm engine, or using metadata for the composable algorithms that are stored in the algorithm database 122-1.

Referring again to FIG. 2, step 210 involves returning results of called composable algorithms designated as being executable using on-demand processing by executing the executable code of the called composable algorithms designated as being executable using on-demand processing. Referring briefly back to FIG. 1, step 210 can be performed by the algorithm engine 112. Referring again to FIG. 2, step 212 involves returning results of called composable algorithms designated as being executable using batch-processing by obtaining the results, of the called composable algorithms designated as being executable using bath-processing, from the batch-process results data store. Referring briefly back to FIG. 1, step 212 can be performed by the algorithm engine 112, which can obtain results of called composable algorithms designated as being executable using bath-processing, from the batch-process results data store 124. Instances of steps 210 and 212 can be performed serially and/or in parallel, depending upon the composable algorithms.

Referring to FIG. 2, step 214 includes recommending one or more items to one or more clients, or to one or more workers that select items for client(s), using results of one or more composable algorithms executed using on-demand processing and/or results (of one or more composable algorithms designated as being executable using batch-processing) obtained from batch-process results data store (e.g., 124 in FIG. 1).

In accordance with certain embodiments, described in additional detail above, the results of the one or more composable algorithms designated as being executable using on-demand processing, are combined with the results of one or more of the called composable algorithms designated as being executable using batch-processing that are obtained from the batch-process results data store (e.g., 124 in FIG. 1). In accordance with certain embodiments, one or more results obtaining from the batch-process results data store (e.g., 124 in FIG. 1) is/are used as one or more inputs to at least one of the one or more of the called composable algorithms designated as being executable using on-demand processing.

In accordance with an embodiment, the method can also include executing executable code of a composable algorithm that is designated as being executable using on-demand processing in response to the composable algorithm being called, and effecting the executing of executable code of a further composable algorithm that is designated as being executable using batch-processing in accordance with a batch-processing schedule associated with the further composable algorithm.

In accordance with an embodiment, step 206 in FIG. 2 can involve accepting a call to a composable algorithm that invokes a combination of two or more of the other composable algorithms, and a further step (not specifically shown in FIG. 2) can involves combining or otherwise using the results of the two or more other composable algorithms that are invoked.

In accordance with certain embodiments, a method can also include caching the results of one or more of the composable algorithms that are executed using on-demand processing so that the results are available, for a period of time specified by a cache interval, if at least one of the one or more of the composable algorithms for which the results are stored in the cache memory is called again during the cache interval. The cache memory 128 in FIG. 1 can be used to perform this additional step.

In accordance with certain embodiments, a method can also include displaying information about one or more items that are recommended for a client directly to a client or to an intermediary (e.g., a worker 132 in FIG. 1) that is tasked with selecting items for a client (e.g., 142 in FIG. 1). In accordance with certain embodiments, a method also includes enabling an author of a new composable algorithm to test the new composable algorithm and visualize the results of the new composable algorithm. A GUI 126 in FIG. 1 can be used to perform one or more of these steps.

Figure 3:
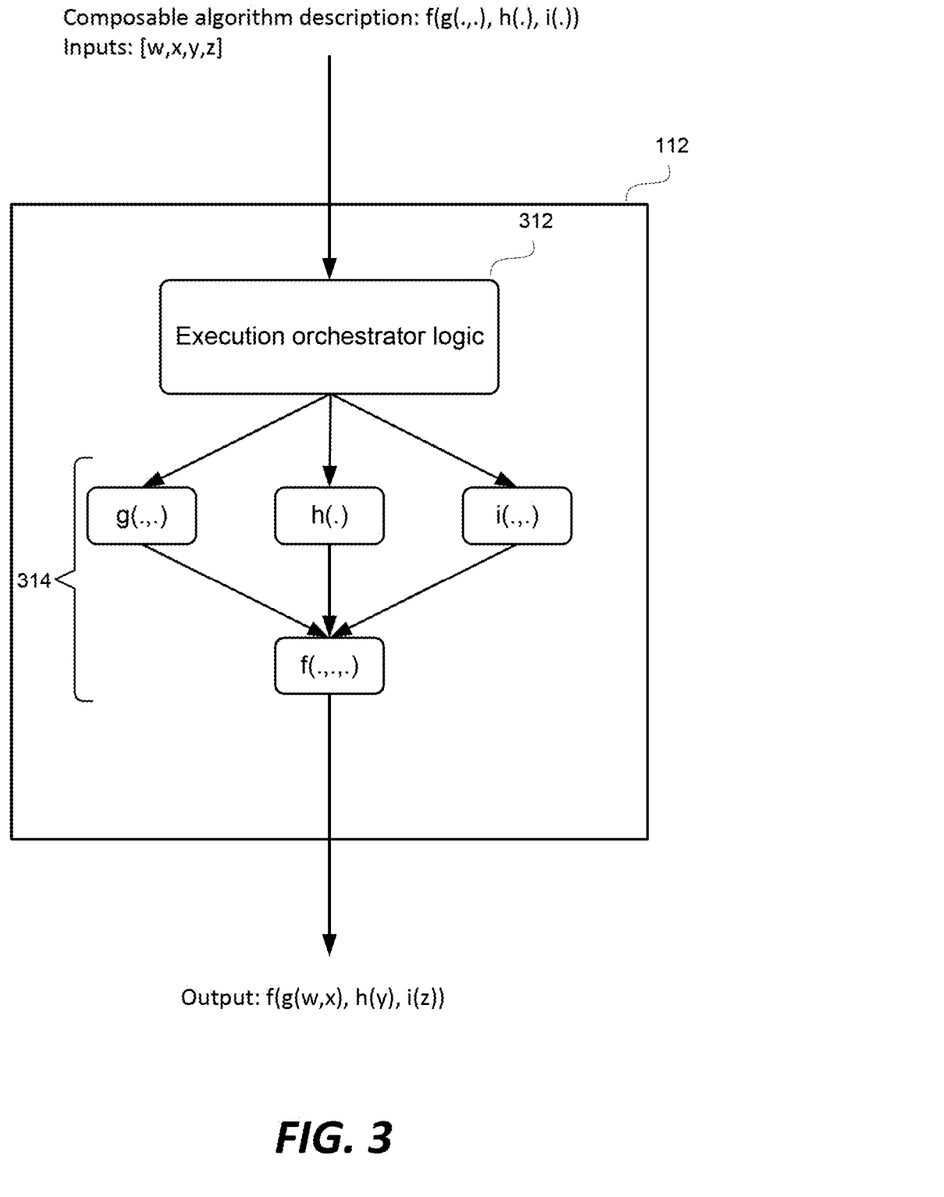
FIG. 3 is a diagram that is used to illustrate exemplary functionality of an algorithm engine according to certain embodiments of the present technology.

FIG. 3 will now be used to illustrate exemplary functionality of the algorithm engine 112. At the top of the FIG. is shown a composable algorithm description f(g(.,.), h(.), i(.)), with inputs: [w,x,y,z], which can be read as algorithm "f" being a function a algorithms "g", "h" and "i", with the input to these algorithms being "w", "x", "y" and "z", which can be, e.g., attributes of clients or items. In this example, the composable algorithm "f" invokes the composable algorithms "g", "h" and "i", with the composable algorithms "g", "h" and "i" being independent of one another, and the composable algorithm "f" combines the results of the composable algorithms "g", "h" and "i" to produce an output, which is shown as f(g(w,x), h(y), i(z)). As shown in FIG. 3, the algorithm engine includes execution orchestrator logic 312 that determines which composable algorithms are capable of being executed in parallel, and which composable algorithms must be performed serially, e.g., because the output of one composable algorithm is provided as the input to another composable algorithm. Further, the algorithm engine includes execution logic 314 that causes the execution of executable code of composable algorithms designated as being executable using on-demand processing to thereby provide results thereof, and causes the results of algorithms designated as being executable using batch-processing to be obtained from the batch-processing results data store 124, and potentially combines results of multiple composable algorithms to produce an output. Preferably and beneficially, the data scientists that author the composable algorithms need not worry about the logistics of the execution of the composable algorithms.

Using embodiments described herein, the algorithm engine 112 can be used to identify a plurality of different subsets of the items in the item inventory 122-3 that are recommended for any particular one of the clients 142 by using one or more of the plurality of different composable recommendation algorithms (stored in the algorithm database 122-1) to generate a different subset of the items in the inventory that is recommended for the particular one of the clients. Such identified subsets of the items in the inventory can be displayed to a specific entity 132 (e.g., a worker) that is tasked with selecting items from the item inventory for the particular one of the clients, or directly to one of the clients. Accordingly, the algorithm engine 112 can be used to parse through data about a relatively large group of items included in an item inventory, and narrow the relatively large group down to a relatively smaller group, and thereafter a worker 132 can use their expert human judgment to select items from the relatively smaller group to provide (e.g., mail, ship, send or otherwise provide) to a client.

Assume, for example, that a particular entity 132 is tasked with selecting five items to send to a particular client 142. Where the number of items included in an inventory is relatively large, and there is a relatively large number of different composable recommendation algorithms (stored in the algorithm database 122-1), the entity tasked with selecting items from the item inventory for one of the clients may be overwhelmed. For example, assume that there are ten thousand different items in the item inventory, and that there are one hundred different composable recommendation algorithms stored in the algorithm database 122-1. Further, assume that each of the different subsets of the items (identified by the algorithm engine 112, using one of the composable recommendation algorithms) includes six items. Each of the subsets of items need not be mutually exclusive, e.g., it is possible that two different subsets of items, identified using two different composable recommendation algorithms, may be the same, but that is highly unlikely. However, there is a greater likelihood that an individual item may be included in more than one of the different subsets of items. Continuing with this example, and assuming that every one of the one hundred different composable recommendation algorithms is utilized by the algorithm engine 112, this would result in one hundred different subsets of six items being identified by the algorithm engine 112. In other words, in this example, information about six hundred items may be displayed the entity 132 tasked with selecting items from the item inventory for one of the clients 142, or directly to one of the clients 142. While narrowing ten thousand items down to six hundred items may be helpful, it is still likely that the entity tasked with selecting items from the item inventory for one of the clients would be overwhelmed, or would at least ignore many of the suggested items. Embodiments of the present technology, which are described herein, can be used to better assist the entity (tasked with selecting items from the item inventory for one of the clients) with making their selections for a client.

In accordance with an embodiment, different composable recommendation algorithms included in the algorithm database 122-1 can have a corresponding different theme. The themes associated with composable recommendation algorithms may or may not be related to specific client attributes. Exemplary themes $_{[JM2]}$that$_{[JRK3]}$ relate to specific client attributes include: good for tall women, good for short women, good for busty women, good for women in the state of Texas, good for preppy women, good for women in their 20s, good for women in their 50s, good for women with a long torso, casual selections, dressy selections, good for tropical vacations, good for spring, good for winter, good for women who like classic styles, good for women that like bohemian styles and/or the like. As can be appreciated from this exemplary list of themes, some of the themes (corresponding to composable recommendation algorithms) can be descriptors that are the same as or similar to descriptors of attributes associated with items in the item inventory. In accordance with an embodiment, for at least some of the themes, each theme (corresponding to a composable recommendation algorithm) indicates a common attribute associated with items selected using the composable recommendation algorithm. For example, the common attribute associated with items selected using the theme "good for tall women" is that all the items selected using the composable recommendation algorithm having that theme are believed to be good for women that are at least 5 feet 8 inches. For another example, the common attribute associated with items selected using the theme "good for women in the State of Texas" is that all the items selected using the composable recommendation algorithm having that theme are believed to be good for women that live in the State of Texas. Composable recommendation algorithms can be even more specific than those exemplary algorithms discussed above, or two or more composable recommendation algorithms can be compounded, e.g., to identify items that are "good for tall women in the State of Texas" or "good for preppy women in winter". As composable algorithms, or combinations of composable algorithms become more specific, their coverage and level of confidence will likely decrease, in which case heuristics can be used to control a minimum coverage and/or confidence threshold.

Other themes can be more general and not specifically related to client attributes$_{[JM4][JRK5]}$. For example, further exemplary themes of composable recommendation algorithms include: best sellers; highest probability of being purchased; highest profit margin; most similar to previously purchased items; least similar to previously purchased items; best for casual events; best for business events; good for fitting in; good for standing out; and/or the like. These are just a few examples that are not intended to be all encompassing. The types of composable recommendation algorithms and the themes associated therewith can vary greatly, depending upon the types of items in an item inventory and the clients for which items are being selected. In accordance with certain embodiments, new composable recommendation algorithms can be added to the algorithm database 122-1 without affecting and/or requiring any specific coordination with the remaining portions of the system 102. This allows new composable algorithms to be tested and trained as desired, and poorly performing composable algorithms to be removed.

In accordance with an embodiment, the algorithm engine 112 is adapted to determine, for each of the composable recommendation algorithms having a theme that indicates a common attribute associate with items selected using the composable recommendation algorithm, whether or not any particular one of the clients satisfies the common attribute. Then, based on such determinations, the algorithm engine 112 can eliminate from being displayed, to an entity that is tasked with selecting items from the item inventory for the particular one of the clients, or directly to the particular one of the clients, information about one or more of the subsets identified using any composable recommendation algorithm having a theme that indicates a common attribute not satisfied by the particular one of the clients. For example, where a particular client is a women that is 5 feet 1 inches tall and lives in the State of Oregon, the algorithm engine 112 can determine that the particular client does not satisfy the attributes "tall" and "living in the State of Texas". Accordingly, the algorithm engine 112 can eliminate from being displayed, to an entity that is tasked with selecting items from the item inventory for that particular client, or directly to that particular client, information about a subset of items believed to be good for tall women, and information about a subset of items believed to be good for women living in the State of Texas. One way that the algorithm engine 112 can do this is to not execute (or not access the results of executing) the composable recommendation algorithm having the theme "good for tall women", and not execute (or not access the results of executing) the composable recommendation algorithm having the theme "good for women living in the State of Texas". Alternatively, the algorithm engine 112 can execute (or access the results of executing) the composable recommendation algorithms having the themes "good for tall women" and "good for women living in the State of Texas", but can ignore or hide the subsets of items identified using those algorithms, or rank or sort the subsets of items identified using those algorithms in such a manner that they will not be displayed. Other variations are also possible and within the scope of an embodiment.

One or more composable recommendation algorithms can calculate a distance or similarity metric between specific attributes associated with a client and specific attributes associated with items in an item inventory, with each distance or similarity metric being assigned a weight. Different composable recommendation algorithms may focus on different attributes and/or may weight distance or similarity metrics differently than one another. Additionally, or alternatively, different composable recommendation algorithms can use different ways to calculate the distance or similarity metrics between specific attributes associated with a client and corresponding attributes associated with items in an item inventory.

In accordance with an embodiment, the algorithm engine 112 is adapted to select for display, to an entity that is tasked with selecting items from the item inventory for the one of the clients, or directly to a client, information about two or more of the plurality of different subsets of the items in the inventory that are identified by executing and/or effecting execution of one or more of the composable algorithms included in the algorithm database 122-1. In order to accomplish this task, the algorithm engine 112 can calculate, for each of at least some of the subsets of items identified using composable recommendation algorithms, one or more metrics that quantify one or more aspects of the subset of items. Exemplary metrics that quantify aspects of a subset of items include, but are not limit to, a metric indicative of probability of successfully (for making a sale), a metric indicative of profit, a metric indicative of similarity to previous items accepted by the one of the clients, a metric indicative of dissimilarity to previous items accepted by the one of the clients, a metric indicative of a probability of client satisfaction, a metric indicative of a probability of client retention, a metric indicative of optimally utilizing a company's inventory, a metric indicative of a cost of fulfilling a client's shipment and/or the like. The algorithm engine 112 can then execute another composable algorithm that sorts at least some of the identified subsets of items, in dependence on at least one of the one or more calculated metrics, to produce a sorted subsets of items. The algorithm engine 112 can then use the sorted subsets of items to select for display information about two or more of the identified subsets of the items in the inventory.

In accordance with an embodiment, the information about two or more of the identified subsets of the items in the inventory can be displayed via a communication interface (e.g., a web browser) to an entity (represented by block 132 in FIG. 1) that is tasked with selecting items from the item inventory for one of the clients, or directly to a client via a communication interface (e.g., a web browser). This eliminates the need for any of the entities (represented by blocks 132 in FIG. 1) or clients (represented by the blocks 142 in FIG. 1) to obtain custom software to enable them to review recommended subsets of items (produced by the algorithm engine 112) and select one or more items from the item inventory to be provided (e.g., shipped or uploaded) to a client. In other words, each entity 132 or client 142 can utilize a communications interface (e.g., a web browser) and a communication network (e.g., the Internet, a LAN, a WAN, a wireless network, an intranet, a private network, a public network, a switched network, combinations of these, and/or the like) to view subsets of items that are recommended for a particular client. In an alternative embodiment, the entities (represented by blocks 132 in FIG. 1) or clients (represented by blocks 142 in FIG. 1) may use customized software to enable them to review recommended subsets of items (produced by the algorithm engine 112) and select one or more items from the item inventory to be provided (e.g., shipped or uploaded) to a client.

Figure 4:
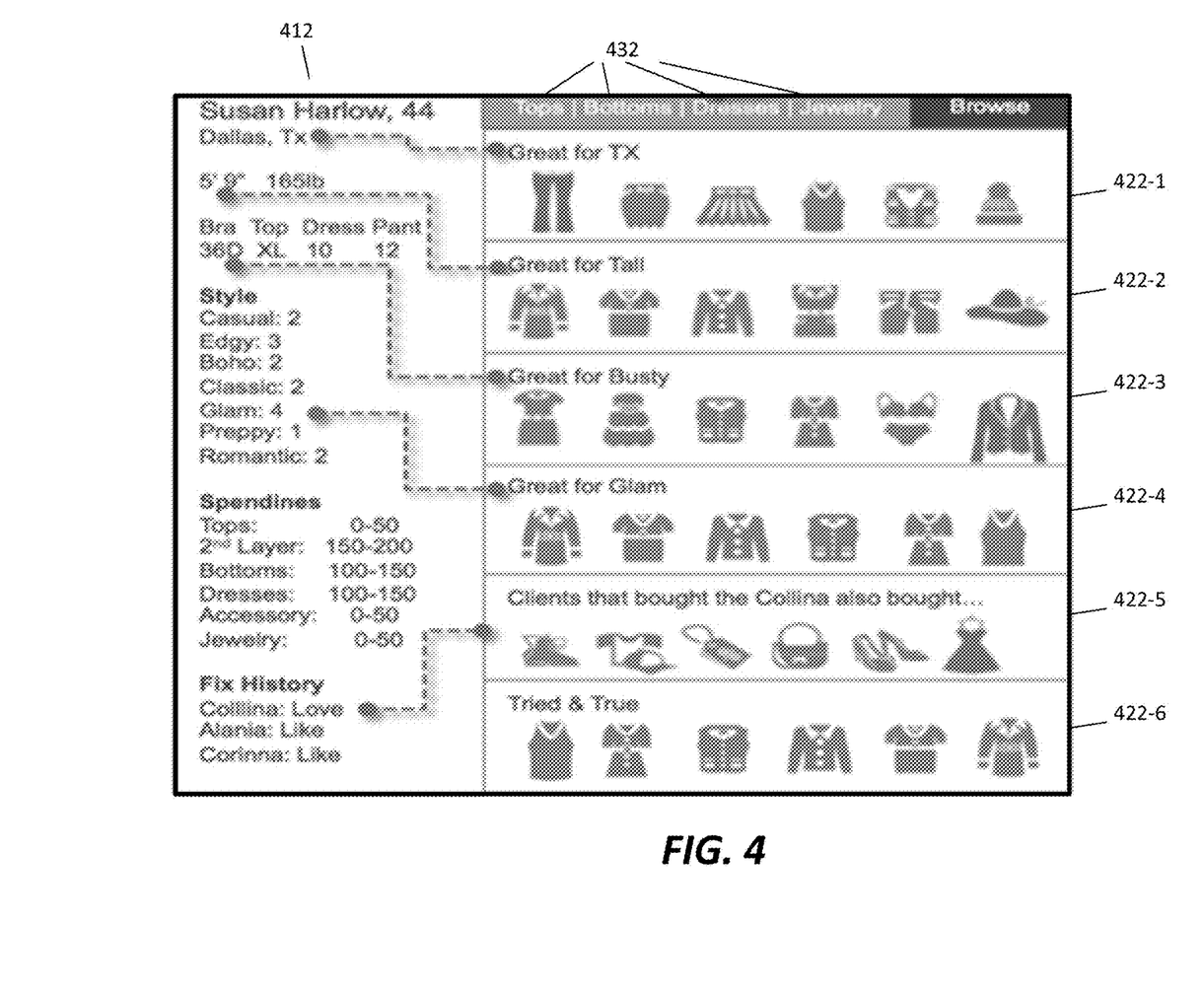
FIG. 4 illustrates an example of the information that can be displayed to a worker tasked with selecting items from an item inventory for a client, wherein the items having information selected for display are identified by an algorithm engine using one or more composable algorithms.

FIG. 4 will now be used to illustrate an example of the information that can be displayed to one of the workers 132 tasked with selecting items from the item inventory for one of the clients 142, wherein the items having information selected for display are identified by an algorithm engine using composable algorithms and/or combinations thereof. The information shown in FIG. 3 can be presented, e.g., via a web page that is accessible via a web browser, but is not limited thereto, and more generally, can be presented via a GUI 126. Referring to FIG. 4, attributes of a specific client are shown in the left most column 412, including: name, age, city and state of residence, bra size, top size, dress size and pant size. Other attributes included in the left most column 412 are information specifying to what extent the client likes specific styles, information specifying how much the client is willing to spend on various types of items of apparel, and historical information specifying to what extent the client has a preference for specific designers or brands. To the right of the left most column 412 are a number of rows 422-1, 422-2, 422-3, 422-4, 422-5 and 422-6, each of which can be referenced to as a row 422, and which collectively can be referenced as rows 422. Each of the rows 422 includes information about a different subset of items identified, by the algorithm engine 112, using a different one, or a different combination, of the composable algorithms included in the algorithm database 122-1. Such displayed information can be textual and/or pictorial information. For example, in FIG. 4, each of the rows 422 includes thumbnails of six items in an identified subset of items. In an embodiment, additional pictures and/or other details about an item can be accessed by clicking on or otherwise selecting the thumbnail corresponding to the item. Each of the rows 422 is also shown as including the name of the theme of the composable recommendation algorithm that was used to select the subset of items included in the row. For example, the theme associated with the row 422-1 is "great for TX", the theme associated with the row 422-2 is "great for tall", the theme associated with the row 422-3 is "great for busty", the theme associated with the row 422-4 is "great for glam" (where "glam" is short for glamourous), the theme associated with the row 422-5 indicates that clients that bought a particular brand (loved by this particular client) also bought . . . , and the theme associated with the row 422-6 is "tried & true". Also shown in FIG. 4 are buttons 432 that enable a worker 132 to filter the displayed items, e.g., such that if the "tops" button was selected, only tops would be displayed or highlighted in the rows 422.

In accordance with an embodiment, the algorithm engine 112 uses a composable row ordering algorithm to determine the order of the rows 422 shown in FIG. 4. Such a composable row ordering algorithm can use metrics, examples of which were mentioned above, to order the rows 422. A further composable algorithm, such as a composable relevancy algorithm, can be used to specify the order of the items in each row, e.g., so a most relevant item (of an identified subset of items) for a particular client is shown at the left most position in the row, and the least relevant item is shown at the right most position in the row.

In FIG. 4, items identified using the same composable algorithm, or the same combination of composable algorithms, are displayed within a same row, i.e., each row corresponds results produced using a same one (or combination) of the composable algorithms. Alternatively, items identified using the same composable algorithm (or the same combination of composable algorithms) can be displayed within a same column, i.e., each column can correspond to the same one of (or combination of) the composable algorithms. More generally, inventory determined to be appropriate for a client can be divided into facets, with each facet representing a subset of items that is matched algorithmically to zero, one or more specific client attributes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A recommendation system that utilizes a combination of batch-processing and on-demand processing in order to efficiently and effectively provide recommendations, the system comprising:
    one or more databases that store
        client data for a plurality of clients,
        item data for a plurality of items that are available for recommending to the clients, and
        executable code for each of a plurality of modular composable algorithms that utilize the client data and/or the item data to provide recommendations, wherein each of the plurality of composable algorithms is executable using both on-demand processing and batch-processing including either using on-demand processing or batch-processing;
    a batch-process results data store that stores results of one or more of the composable algorithms that are executed using batch-processing;
    an algorithm engine that
        accepts calls to one or more of the composable algorithms;
        determines which of the called composable algorithms is/are designated as being executable using batch-processing, and which of the called composable algorithms is/are designated as being executable using on-demand processing;
        returns results of called composable algorithms designated as being executable using on-demand processing by executing the executable code of the called composable algorithms designated as being executable using on-demand processing; and
        returns results of called composable algorithms designated as being executable using batch processing by obtaining the results, of the called composable algorithms designated as being executable using batch-processing, from the batch-process results data store; and
        outputs the results of the called composable algorithms.

2. The system of claim 1, wherein the algorithm engine includes an algorithm engine interface that:
    accepts the calls to one or more of the composable algorithms, wherein the calls that are accepted by the algorithm engine interface do not distinguish between whether the composable algorithms being called are designated as being executable using batch-processing or designated as being executable using on-demand processing.

3. The system of claim 1, where the algorithm engine provides the results that the algorithm engine returns to the algorithm engine interface so that the algorithm engine interface can output the results.

4. The system of claim 1, wherein during one or more instances that the algorithm engine executes the executable code for one or more of the called composable algorithms designated as being executable using on-demand processing, the algorithm engine combines the results of the one or more composable algorithms designated as being executable using on-demand processing with the results of one or more of the called composable algorithms designated as being executable using batch-processing that are obtained from the batch-process results data store.

5. The system of claim 1, wherein during one or more instances that the algorithm engine executes the executable code for one or more of the called composable algorithms designated as being executable using on-demand processing, the algorithm engine utilizes one or more results obtaining from the batch-process results data store as one or more inputs to at least one of the one or more of the called composable algorithms designated as being executable using on-demand processing.

6. The system of claim 1, wherein:
    the executable code, of each of the one or more of the composable algorithms that is/are designated as being executable using batch-processing, is executed by a service other than the algorithm engine and is executed in accordance with a predetermined schedule; and
    the executable code, of each of the one or more of the composable algorithms that is/are designated as being executable using on-demand processing, is executed by the algorithm engine in response to being called.

7. The system of claim 1, wherein at least one of the composable algorithms, for which executable code is stored in the one or more databases, invokes a combination of two or more of the other composable algorithms and includes logic for combining or otherwise using the results of the two or more other composable algorithms that are invoked.

8. The system of claim 1, wherein each of the composable algorithms includes corresponding metadata and a corresponding computation function, the metadata for each of the composable algorithms comprising at least a name of the composable algorithm, an author of the composable algorithm and a pointer.

9. The system of claim 8, wherein:
the metadata for each of the composable algorithms also includes an indication of whether the composable algorithm is designated as being executable using on-demand processing, or is designated as being executable using batch-processing;
the pointer included in the metadata of a said composable algorithm that is designated as being executable using on-demand processing points to a corresponding computation function; and
the pointer included in the metadata of a said composable algorithm that is designated as being executable using batch-processing points to a corresponding result of the said composable algorithm stored as data in the batch-process results data store.

10. The system of claim 1, further comprising:
cache memory;
wherein the algorithm engine stores, in the cache memory, the results of one or more of the composable algorithms that are executed using on-demand processing so that the said results are available, for a period of time specified by a cache interval, if at least one of the one or more of the composable algorithms for which the results are stored in the cache memory is called again during the cache interval.

11. The system of claim 1, further comprising a graphical user interface (GUI) that displays information about one or more items that are recommended for a said client, as determined using the algorithm engine, directly to a said client or to an intermediary that is tasked with selecting items for the said client.

12. The system of claim 1, further comprising a graphical user interface (GUI) that enables an author of a new said composable algorithm to test the new said composable algorithm and visualize the results of the new said composable algorithm.

13. The system of claim 1, wherein:
one or more of the composable algorithms that are executed using on-demand processing utilize the results of one or more of the composable algorithms that are executed using batch-processing and stored in the results data store; and
the results of one or more of the composable algorithms that are executed using on-demand processing are used to recommend one or more of the items to one or more of the clients, or are used to recommend one or more of the items to one or more entities that is/are tasked with selecting one or more of the items for one or more of the clients.

14. The system of claim 1, wherein:
the client data for each of the plurality of clients includes a unique client identifier (client ID) and one or more attributes associated with the client; and
the item data for each of the plurality of items includes a unique item identifier (item ID) and one or more attributes associated with the item.

15. The system of claim 14, wherein:
the results of each of the composable algorithms, that are executed using batch-processing and stored in the results batch-process data store, comprises an array of tuples; and
each of the tuples, in a said array of tuples, comprises at least one of a said client ID or a said item ID and a corresponding score.

16. The system of claim 15, wherein at least two or more of the composable algorithms comprise similarity algorithms each of which is used to compare the attributes of different ones of the items to one another, the attributes of different ones of the clients to one another or the attributes of one or more of the clients to the attributes of one or more of the items.

17. A method that utilizes a combination of batch-processing and on-demand processing in order to efficiently and effectively provide recommendations, the method comprising:
storing, in one or more databases, client data for a plurality of clients, item data for a plurality of items that are available for recommending to the clients, and executable code for each of a plurality of modular composable algorithms that utilize the client data and/or the item data to provide recommendations, wherein each of the plurality of composable algorithms is executable using both on-demand processing and batch-processing including either using on-demand processing or batch-processing;
storing, in a batch-process results data store, results of one or more of the composable algorithms that are executed using batch-processing;
accepting calls to one or more of the composable algorithms, wherein the calls that are accepted do not distinguish between whether the composable algorithms being called are executable using batch-processing or executable using on-demand processing; and
determining which of the called composable algorithms is/are designated as being executable using batch-processing, and which of the called composable algorithms is/are designated as being executable using on-demand processing;
returning results of called composable algorithms designated as being executable using on-demand processing by executing the executable code of the called composable algorithms designated as being executable using on-demand processing;
returning results of called composable algorithms designated as being executable using batch-processing by obtaining the results, of the called composable algorithms designated as being executable using batch-processing, from the batch-process results data store; and
outputting the results of the called composable algorithms.

18. The method of claim 17, further comprising:
combining the results of the one or more composable algorithms designated as being executable using on-demand processing with the results of one or more of the called composable algorithms designated as being executable using batch-processing that are obtained from the batch-process results data store.

19. The method of claim 17, further comprising:
utilizing one or more results obtaining from the batch-process results data store as one or more inputs to at least one of the one or more of the called composable algorithms designated as being executable using on-demand processing.

20. The method of claim 17, further comprising:
executing executable code of a said composable algorithm that is designated as being executable using on-demand processing in response to the said composable algorithm being called; and
effecting execution of executable code of a further said composable algorithm that is designated as being executable using batch-processing in accordance with a batch-processing schedule associated with the further said composable algorithm.

21. The method of claim 17, wherein the accepting calls to one or more of the composable algorithms includes accepting a call to a composable algorithm that invokes a combination of two or more of the other composable algorithms; and further comprising combining or otherwise using the results of the two or more other composable algorithms that are invoked.

22. The method of claim 17, wherein each of the composable algorithms includes corresponding metadata and a corresponding computation function, the metadata for each of the composable algorithms comprising at least a name of the composable algorithm, an author of the composable algorithm and a pointer.

23. The method of claim 22, wherein:
the metadata for each of the composable algorithms also includes an indication of whether the composable algorithm is designated as being executable using on-demand processing, or is designated as being executable using batch-processing;
the pointer included in the metadata of a said composable algorithm that is designated as being executable using on-demand processing points to a corresponding computation function; and
the pointer included in the metadata of a said composable algorithm that is designated as being executable using batch-processing points to a corresponding result of the said composable algorithm stored as data in the batch-process results data store.

24. The method of claim 17, further comprising:
caching the results of one or more of the composable algorithms that are executed using on-demand processing so that the said results are available, for a period of time specified by a cache interval, if at least one of the one or more of the composable algorithms for which the results are stored in the cache memory is called again during the cache interval.

25. The method of claim 17, further comprising displaying information about one or more items that are recommended for a said client directly to a said client or to an intermediary that is tasked with selecting items for the said client.

26. The method of claim 17, further comprising enabling an author of a new said composable algorithm to test the new said composable algorithm and visualize the results of the new said composable algorithm.

27. The method of claim 17, further comprising:
one or more of the composable algorithms that are executed using on-demand processing utilizing the results of one or more of the composable algorithms that are executed using batch-processing and stored in the results data store; and
recommending one or more of the items for one or more of the clients by utilizing the results of one or more of the composable algorithms that are executed using on-demand processing.

28. The method of claim 17, wherein:
the stored client data for each of the plurality of clients includes a unique client identifier (client ID) and one or more attributes associated with the client;
the stored item data for each of the plurality of items includes a unique item identifier (item ID) and one or more attributes associated with the item;
the results of each of the composable algorithms, that are executed using batch-processing and stored in the results batch-process data store, comprises an array of tuples; and
each of the tuples, in a said array of tuples, comprises at least one of a said client ID or a said item ID and a corresponding score.

29. The method of claim 28, wherein at least two or more of the composable algorithms comprise similarity algorithms each of which is used to compare one or more of the attributes of different ones of the items to one another, one or more of the attributes of different ones of the clients to one another, or one or more of the attributes of one or more of the clients to one or more of the attributes of one or more of the items.

30. One or more non-transitory processor readable storage devices having instructions encoded thereon which when executed cause one or more processors to perform a method for utilizing a combination of batch-processing and on-demand processing to provide recommendations, the method comprising:
accepting calls to one or more modular composable algorithms, wherein each of the one or more composable algorithms is executable using both on-demand processing and batch-processing including either using on-demand processing or batch-processing; and
identifying which of the called composable algorithms are designated as being executable using batch-processing, and which of the called composable algorithms are designated as being executable using on-demand processing;
returning results of called composable algorithms designated as being executable using on-demand processing by executing the executable code of the called composable algorithms designated as being executable using on-demand processing;
returning results of called composable algorithms designated as being executable using batch-processing by obtaining the results, of the called composable algorithms designated as being executable using batch-processing, from a batch-process results data store; and
outputting results of the called composable algorithms.

31. The one or more processor readable storage devices of claim 30, wherein the method further comprises:
combining the results of the one or more composable algorithms designated as being executable using on-demand processing with the results of one or more of the called composable algorithms designated as being executable using batch-processing that are obtained from the batch-process results data store.

32. The one or more processor readable storage devices of claim 30, wherein the method further comprises:
utilizing one or more results obtaining from the batch-process results data store as one or more inputs to at least one of the one or more of the called composable algorithms designated as being executable using on-demand processing.

* * * * *